(12) United States Patent
Suzuki

(10) Patent No.: US 6,331,741 B1
(45) Date of Patent: Dec. 18, 2001

(54) ELECTROMAGNETIC DRIVING DEVICE

(75) Inventor: Ryuji Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,489

(22) Filed: Nov. 12, 1999

(30) Foreign Application Priority Data

Nov. 16, 1998 (JP) .................................................. 10-342376
Apr. 9, 1999 (JP) .................................................. 11-102995

(51) Int. Cl.$^7$ .................................................. H02K 37/00
(52) U.S. Cl. .................................. 310/49 R; 310/156.01; 310/216; 396/463
(58) Field of Search .................................. 310/49 R, 216, 310/217, 156, 68 B; 396/463, 469, 471, 452, 449, 508

(56) References Cited

U.S. PATENT DOCUMENTS

| | | | |
|---|---|---|---|
| 4,528,533 | * 7/1985 | Montagu | 335/230 |
| 4,554,471 | * 11/1985 | Bertram et al. | 310/49 R |
| 4,793,689 | 12/1988 | Aoyagi et al. | 350/255 |
| 4,893,142 | * 1/1990 | Ishida et al. | 354/234.1 |
| 5,216,314 | 6/1993 | Suzuki | 310/323 |
| 5,335,115 | 8/1994 | Kawai et al. | 359/696 |
| 5,384,506 | * 1/1995 | Aoshima | 310/49 R |
| 5,428,260 | 6/1995 | Suzuki | 310/323 |
| 5,448,328 | 9/1995 | Suzuki et al. | 354/400 |
| 5,633,553 | 5/1997 | Suzuki | 310/323 |
| 5,684,353 | 11/1997 | Fujimoto et al. | 310/323 |
| 5,757,108 | * 5/1998 | Suzuki | 310/49 R |
| 5,969,444 | * 10/1999 | Kamitani | 310/49 R |

FOREIGN PATENT DOCUMENTS 3-207254    9/1991 (JP) .

* cited by examiner

Primary Examiner—Nestor Ramirez
Assistant Examiner—Thanh Lam
(74) Attorney, Agent, or Firm—Fitzpatrick, Cella, Harper & Scinto

(57) ABSTRACT

In a motor or an electromagnetic driving device having a first stator yoke excitable by energizing a first coil, a second stator yoke excitable by energizing a second coil and a rotor opposed to the first and second stator yokes to be driven and rotated by energizing the first and second coils, the first and second coils are collectively arranged together in one direction on the outer side of the periphery of the rotor, and the first stator yoke is arranged in a state of being superposed on the second stator yoke to form an electromagnetic driving motor. The electromagnetic driving motor is thus arranged in a novel shape to be capable of preventing a noise of driving transmission while maintaining its adequate performance as an electromagnetic driving motor and to be compactly mountable on a camera or the like for its diaphragm device without any protruding part.

21 Claims, 9 Drawing Sheets

ELECTROMAGNETIC DRIVING DEVICE

BACKGROUND OF THE INVENTION

1. Field of the Invention

The present invention relates to an electromagnetic driving device having a construction adapted for driving the diaphragm blades of a diaphragm device of, for example, a camera or the like.

2. Description of Related Art

Heretofore, electromagnetic driving devices using electromagnetic driving motors as drive sources, such as an electromagnetic driving diaphragm device which uses a stepping motor as a drive source, have been arranged, as disclosed in Japanese Laid-Open Patent Application No. HEI 3-207254, for example, to have a stator yoke and a coil arranged in one unit to extend in two radial directions with respect to the rotation axis of a rotor (two-phase type). Such a stepping motor has a shape that protrudes with respect to the diaphragm device.

In the stepping motor, a rotor shaft which is a motor output shaft protrudes from the stepping motor. A rotation output member such as a gear is provided on the protruding rotor shaft. Generally, the electromagnetic driving diaphragm device is thus arranged to drive a working member which drives diaphragm blades by the rotation of the gear on the rotor shaft.

In the above-stated example of conventional arrangement, the electromagnetic driving motor, i.e., a stepping motor, is arranged to protrude with respect to the diaphragm device. The protruding arrangement, however, hinders efforts to reduce the size of products and is thus against the recent trend of reduction in size. In other words, in the case of the stepping motor of the type disclosed in Japanese Laid-Open Patent Application No. HEI 3-207254, the stator yoke and the coil are arranged to extend in two radial directions with respect to the axis of rotation of the rotor (two-phase type). Therefore, the motor part flatly protrudes over a wide area for the diaphragm device. In a case where the layout of a camera or like product necessitates some other part to be also disposed in the motor space, therefore, the design of the camera or the like must be changed to avoid the use of the motor space for the part. Then, the change tends to cause the structural arrangement of the product to become complex or hinder reduction in size of the product.

In respect to the structural arrangement of the electromagnetic driving motor, the motor is of the type having a rotor shaft protruding therefrom. Therefore, the protruding part of the motor is supported only on its one side in a cantilever-like (or in an overhanging-impeller-like) manner, although the rotor is supported on its two sides within the electromagnetic driving motor (in a center impeller-like manner). Since the working member is under some amount of load, when a rotation force is transmitted to the working member under such a condition, some force is applied to the gear of the rotor shaft in its radial direction by a reaction to the load. This force exerts some lateral pressure on the rotor shaft to warp the free end side of the cantilever-like-supported rotor shaft.

Meanwhile, a force acts to restore the rotor shaft to its normal state against the warping force caused by the load of the working member. When the rotor shaft is caused to rotate under this condition, the rotor shaft comes to rotate in a whirling manner. Then, vibrations are transmitted to the working member within the diaphragm device. As a result, a chattering sound or chattering vibration arises there.

Such a chattering sound or chattering vibration has an adverse effect on the recent trend of arranging cameras or the like to make no sound and deteriorates the quality of the products. Besides, since a concentrated stress is applied to the bearing of the rotor by the lateral pressure on the rotor shaft, the performance of the motor is lowered by the stress.

Further, since the working member which drives the diaphragm blades within the diaphragm device rotates at high speed, the lateral pressure on the rotor shaft becomes very large to make the above-stated problems more serious.

BRIEF SUMMARY OF THE INVENTION

The present invention is made to solve the problems of the prior art described above. It is, therefore, an object of the invention to provide an electromagnetic driving device advantageously arranged for driving diaphragm blades of a diaphragm device of a camera or the like.

Another object of the invention is to provide an electromagnetic driving device which is arranged to be capable of maintaining a stable output without causing any vibration and noise.

To attain the above objects, in accordance with an aspect of the invention, there is provided an electromagnetic driving device comprising a first permanent magnet, a second permanent magnet arranged to be opposed to the first permanent magnet, a rotation shaft arranged to interconnect the first permanent magnet and the second permanent magnet, the rotation shaft constituting a rotor in conjunction with the first permanent magnet and the second permanent magnet, a first stator yoke having magnetic poles opposed to a peripheral part of the first permanent magnet, the first stator yoke being arranged to extend from the peripheral part of the first permanent magnet toward an outside thereof, a second stator yoke having magnetic poles opposed to a peripheral part of the second permanent magnet, the second stator yoke being arranged to extend from the peripheral part of the second permanent magnet toward an outside thereof in the same direction as the extending direction of the first stator yoke, a first coil arranged to excite the first stator yoke, the first coil being disposed at the first stator yoke, and a second coil arranged to excite the second stator yoke, the second coil being disposed at the second stator yoke.

In accordance with another aspect of the invention, there is provided an electromagnetic driving device comprising a rotor having a rotation output part arranged to allow a rotation output to be externally taken out, a first stator yoke opposed to a peripheral part of the rotor, a second stator yoke opposed to the peripheral part of the rotor, the second stator yoke being arranged to extend from the peripheral part of the rotor toward an outside thereof together with the first stator yoke and being disposed to be superposed on the first stator yoke, a first coil arranged at the first stator yoke to excite the first stator yoke, a second coil arranged at the second stator yoke to excite the second stator yoke, energization of the first coil and the second coil being controlled to control rotation of the rotor, a first fixing member arranged to support the first stator yoke and the first coil, the first fixing member having an aperture part formed on an inner circumferential side thereof to allow photo-taking light to pass therethrough, a plurality of diaphragm blades arranged to adjust a quantity of the photo-taking light, a second fixing member arranged to hold the plurality of diaphragm blades between the first fixing member and the second fixing member, and a working member for driving the plurality of diaphragm blades, the working member being arranged between the first fixing member and the second fixing member to be driven by the rotation output part of the rotor.

These and further objects and features of the invention will become apparent from the following detailed description of preferred embodiments thereof taken in connection with the accompanying drawings.

DETAILED DESCRIPTION OF THE PREFERRED EMBODIMENTS

Hereinafter, preferred embodiments of the invention will be described in detail with reference to the drawings.

Figure 1:
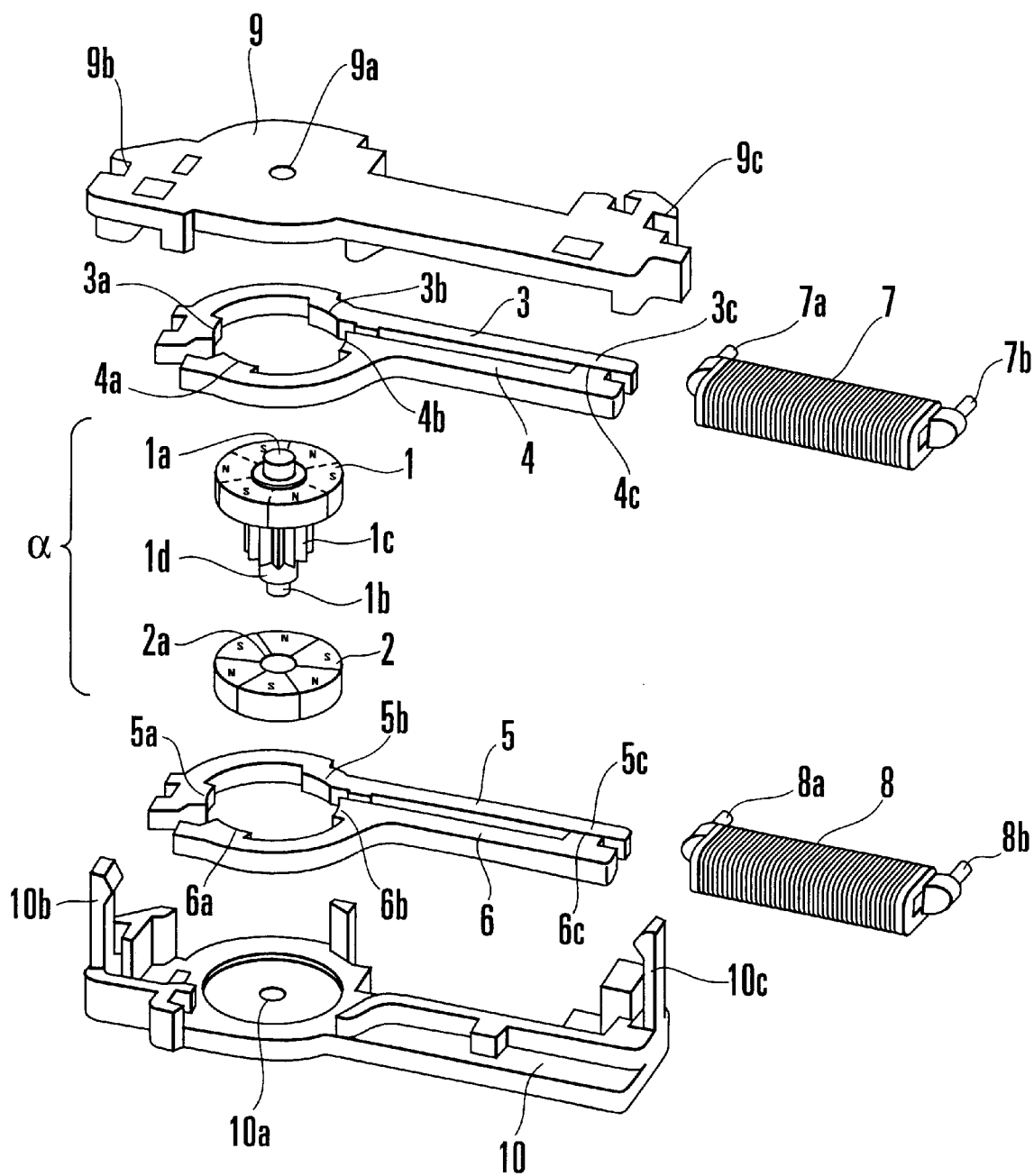
FIG. 1 is an exploded perspective view of a motor serving as an electromagnetic driving device according to an embodiment of the invention.
Figure 2:
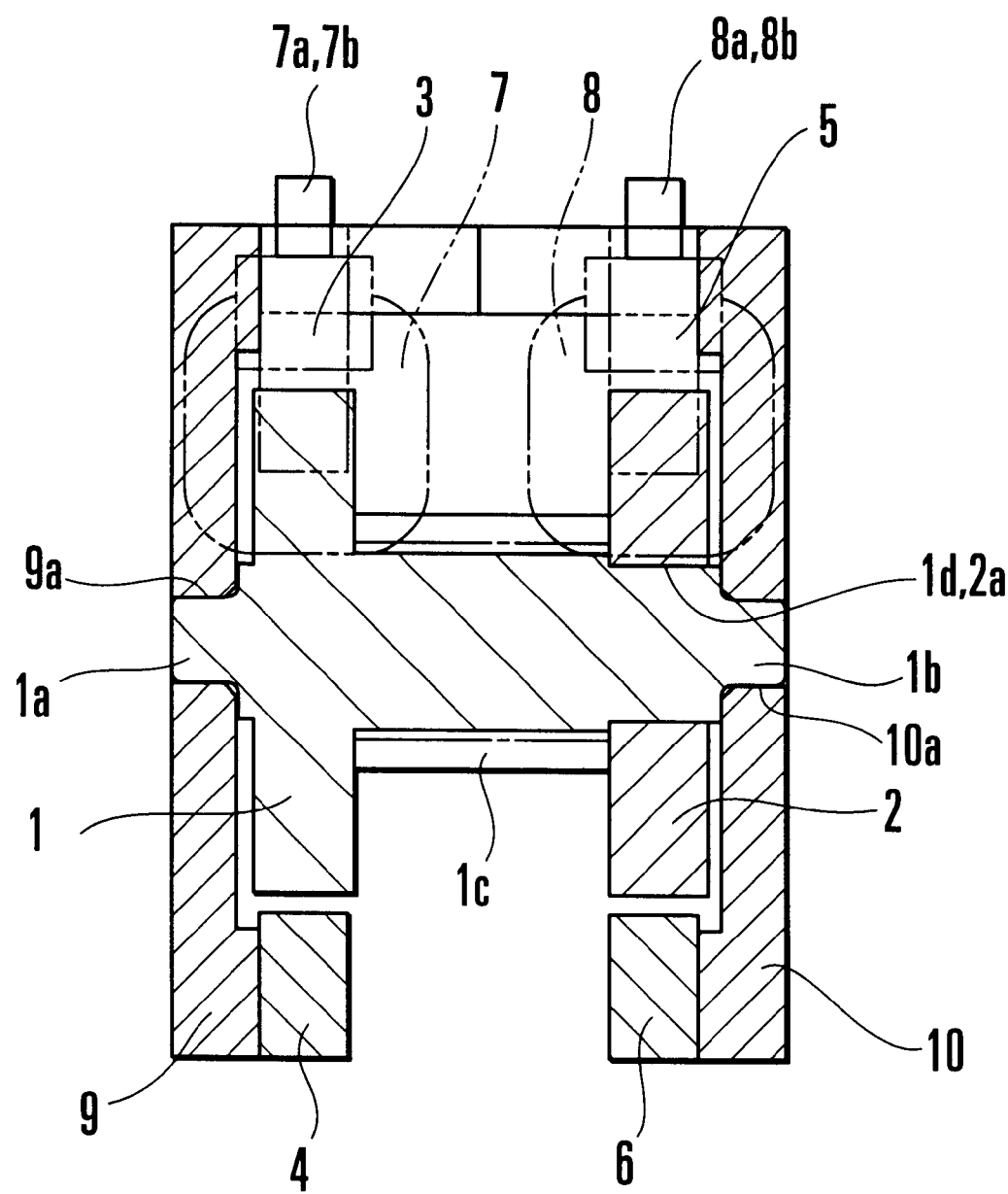
FIG. 2 is a sectional view showing the motor shown in FIG. 1 in an assembled state.
Figure 3:
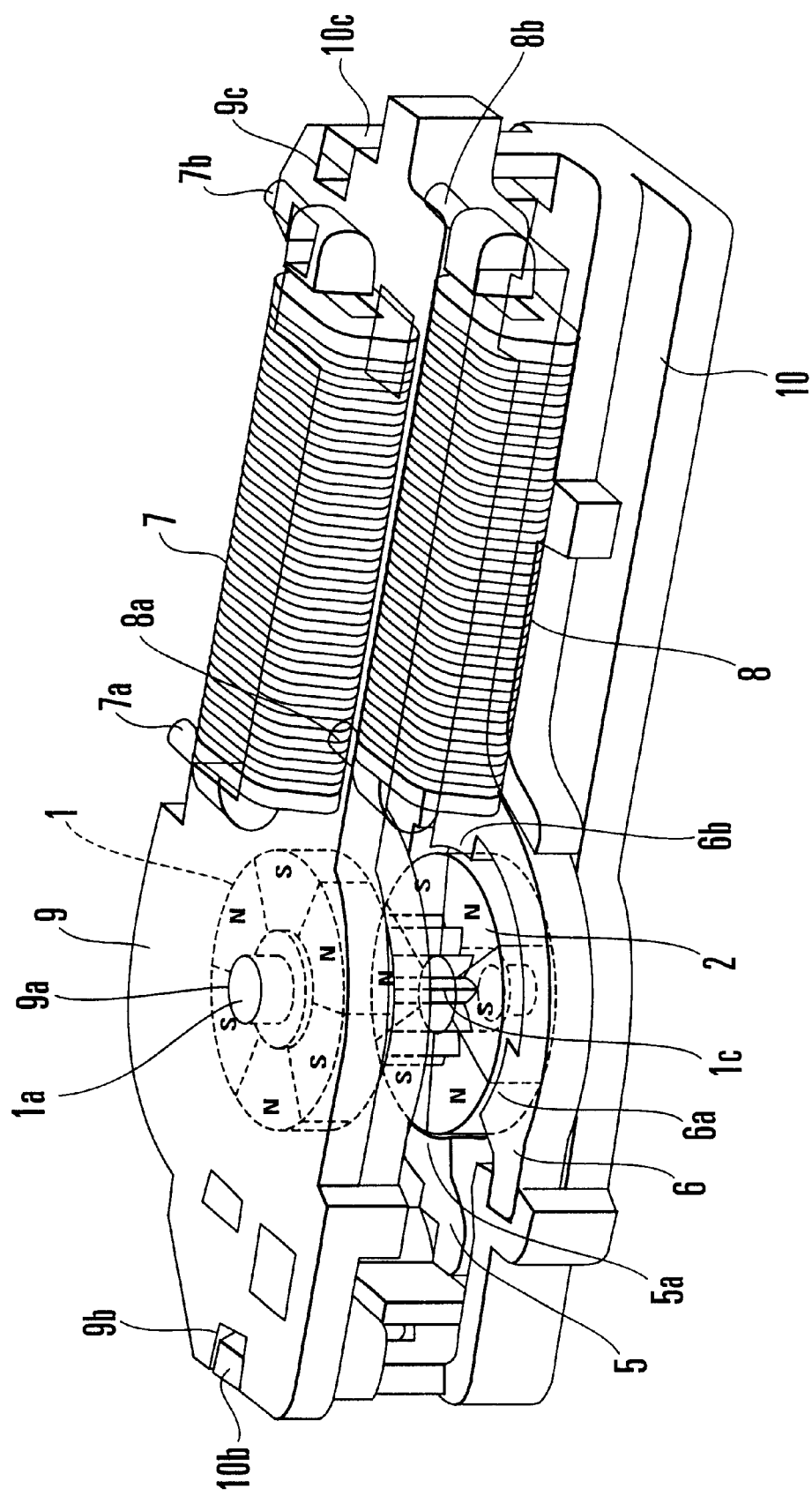
FIG. 3 is a perspective view showing the motor shown in FIG. 1 in an assembled state.

A stepping motor serving as an electromagnetic driving device according to an embodiment of the invention is first described. FIG. 1 is an exploded perspective view of the stepping motor serving as an electromagnetic driving device. FIG. 2 is a sectional view of the stepping motor. FIG. 3 shows the stepping motor in an assembled state.

Referring to FIGS. 1, 2 and 3, a first rotor 1, which is made of a permanent magnet, has a magnetized part formed on its outer circumferential surface to have six magnetic poles. At the first rotor 1, rotation shafts 1a and 1b, a gear 1c which is a rotation output part and a shaft part 1d are formed in one unified body.

A second rotor 2, which is made of a permanent magnet, has a magnetized part formed on its outer circumferential surface to have six magnetic poles. At the second rotor 2, a hole part 2a is fitted on and secured to the shaft part 1d of the first rotor 1. By this arrangement, a rotor "α" is formed to have the gear part 1c at the center of thrust in the direction of its rotation axis, and to have cylindrical parts having the respective magnetized parts on their outer circumferential surfaces above and below the thrust part of the gear 1c. The first rotor 1 and the second rotor 2 are secured to each other in such a way as to have their rotation phases differ 90 degrees from each other in terms of electrical angle. The gear 1c is formed to have its diameter smaller than the diameters of the first and second rotors 1 and 2 which are made of permanent magnets.

A first stator yoke 3, which is made of a soft magnetic material, has two projections 3a and 3b arranged to be opposed to the magnetic pole part of the first rotor 1 at two parts thereof. The projections 3a and 3b, which serve as magnetic poles of a first stator, are located away 360 degrees from the magnetic poles of the first rotor 1 in terms of electrical angle.

Another first stator yoke 4, which is made of a soft magnetic material, has two projections 4a and 4b arranged to be opposed to the magnetic pole part of the first rotor 1 at two parts thereof. The projections 4a and 4b, which serve as magnetic poles of the first stator, are located away 360 degrees from the magnetic poles of the first rotor 1 in terms of electrical angle. Further, the projection 4a is located 180 degrees away from the projection 3a in terms of electrical angle. The projection 4b is located 180 degrees away from the projection 3b in terms of electrical angle. The first stator yoke 3 and the first stator yoke 4 abut each other at their root parts 3c and 4c to close a magnetic path, thus forming one of two phases of the two-phase stepping motor.

A second stator yoke 5 is composed of parts which are the same as the parts of the first stator yoke 3. The second stator yoke 5 has two projections 5a and 5b arranged to be opposed to the magnetic pole part of the second rotor 2 at two parts thereof. The two projections 5a and 5b, which serve as magnetic poles of a second stator, are located 360 degrees away from the magnetic poles of the second rotor 2 in terms of electrical angle.

Another second stator yoke 6 is composed of parts which are the same as the parts of the first stator yoke 4. The second stator yoke 6 has two projections 6a and 6b opposed to two magnetic pole parts of the second rotor 2 at two parts thereof. The projections 6a and 6b, which serve as magnetic poles of the second stator, are located 360 degrees away from the magnetic poles of the second rotor 2 in terms of electrical angle. Further, the projection 6a is located 180 degrees away from the projections 5a while the projection 6b is located 180 degrees away from the projection 5b in terms of electrical angle. The second stator yoke 5 and the second stator yoke 6 abut on each other at their root parts 5c and 6c to close a magnetic path, thus forming the other of two phases of the two-phase stepping motor. Further, the first stator yokes 3 and 4 are arranged to be superposed on the second stator yokes 5 and 6 in the direction of the rotation axis of the rotor α.

A first coil 7, which has terminal parts 7a and 7b, is inserted on the first stator yoke 3. The first coil 7 is arranged to excite the first stator yokes 3 and 4 when energized through the terminal parts 7a and 7b.

A second coil 8 is composed of parts which are the same as those of the first coil 7. The second coil 8, which has terminal parts 8a and 8b, is inserted on the second stator yoke 5. The second coil 8 is arranged to excite the second stator yokes 5 and 6 when energized through the terminal parts 8a and 8b. Further, the first coil 7 and the second coil 8 are disposed to be collected in one direction outside the outer circumferential part of the rotor α.

A first motor case 9 is arranged to position and set the first stator yokes 3 and 4 in their places in a known manner. The first motor case 9 has a hole part 9a in which the rotation shaft 1a of the first rotor 1 is rotatably fitted.

A second motor case 10 is arranged to position and set the second stator yokes 5 and 6 in their places in a known manner. The second motor case 10 has a hole part 10a in which the rotation shaft 1b of the first rotor 1 is rotatably fitted. Further, the second motor case 10 is provided with claw parts 10b and 10c. The first and second motor cases 9 and 10 are positioned and caused to engage each other by inserting the claw parts 10b and 10c into groove parts 9b and 9c of the first motor case 9. By this arrangement, the stepping motor is formed into one unit, as shown in FIGS. 2 and 3.

As will be understood from the above description, the gear 1c is located at the center part of thrust in the direction of the rotation axis of the rotor "α". Therefore, the rotation output of the stepping motor is taken out from a thrust clearance provided between the first stator yokes 3 and 4 and the second stator yokes 5 and 6.

The operation of the electromagnetic motor, i.e., the stepping motor, is next described as follows. FIGS. 4(a) to 4(e) show how the stepping motor is driven by a 1-2 phase driving action. In each of FIGS. 4(a) to 4(e), the left-side illustration shows a portion of one phase (for example, phase A) of the stepping motor in which a magnetic circuit is formed by the first stator yokes 3 and 4, and the right-side illustration shows a portion of another one phase (for example, phase B) of the stepping motor in which a magnetic circuit is formed by the second stator yokes 5 and 6.

Figure 4A:
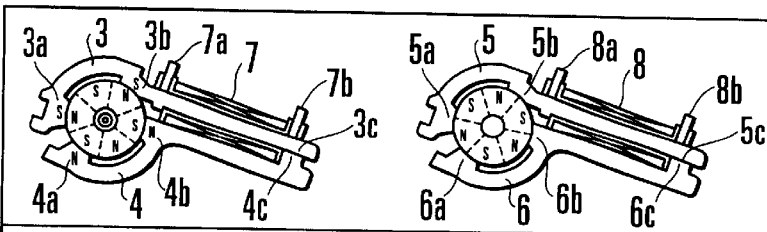
FIGS. 4(a) to 4(e) are diagrams for explaining the rotating action of the motor shown in FIG. 3.

FIG. 4(a) shows the initial state of the stepping motor. In the initial state, the first coil 7 is energized to excite the projections 3a and 3b of the first stator yoke 3 into S poles and the projections 4a and 4b of the first stator yoke 4 into N poles, so that the center of magnetizing angle of the first rotor 1 is made to coincide with the angle center of the projections 3a, 3b, 4a and 4b. On the other hand, since the second coil 8 is not energized, the second stator yokes 5 and 6 are not excited. Therefore, the center of magnetizing angle of the second rotor 2 differs 90 degrees in electrical angle from the angle center of the projections 5a, 5b, 6a and 6b of the second stator yokes 5 and 6.

Figure 4B:
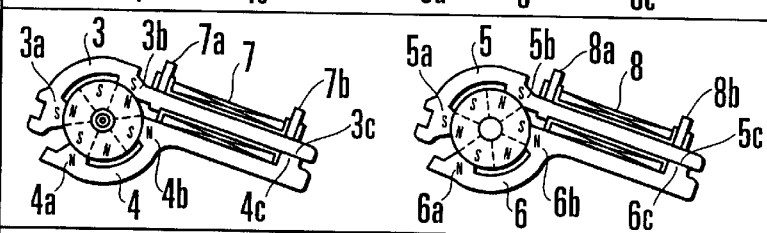

When the second coil 8 is energized, in this state, to excite the projections 5a and 5b of the second stator yoke 5 into S poles and the projections 6a and 6b of the second stator yoke 6 into N poles, the second rotor 2 is attracted and repelled by the magnetic poles. Then, the rotor α, which is composed of the first and second rotors 1 and 2, rotates clockwise. Then, since the first stator yokes 3 and 4 continue to be in their excited states, the rotor α(the first rotor 1 and the second rotor 2) stops after having rotated 45 degrees in electrical angle, as shown in FIG. 4(b).

Figure 4C:
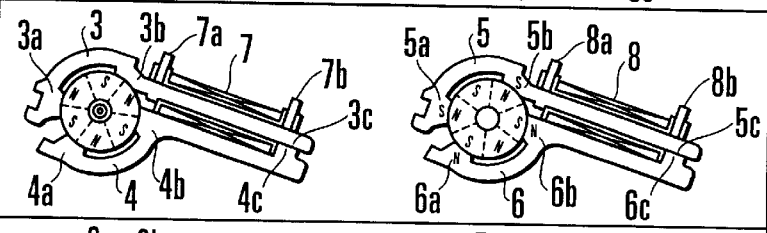

Next, when the first stator yokes 3 and 4 are deexcited, the excitation of the second stator yokes 5 and 6 causes the second rotor 2 to rotate 45 degrees further clockwise in electrical angle in such a way as to make the magnetization angle center of the second rotor 2 to coincide with the angle center of the projections 5a, 5b, 6a and 6b. The second rotor 2 then comes to a stop after having rotated 45 degrees in electrical angle, as shown in FIG. 4(c).

Figure 4D:
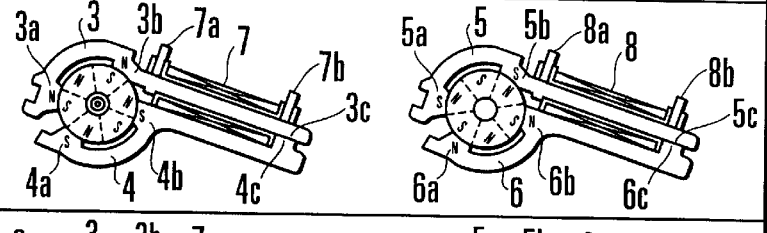

Next, when the first coil 7 is energized again, the first stator yokes 3 and 4 are excited this time in such a way as to make the projections 3a and 3b of the first stator yoke 3 into N poles and the projections 4a and 4b of the first stator yoke 4 into S poles. The first rotor 1 is then attracted and repelled by these magnetic poles to cause the rotor α (the first rotor 1 and the second rotor 2) to rotate further clockwise. Then, since the second stator yokes 5 and 6 still continue to be in their excited states, the rotor α (the first rotor 1 and the second rotor 2) comes to a stop after having rotated 45 degrees in electrical angle, as shown in FIG. 4(d).

Figure 4E:
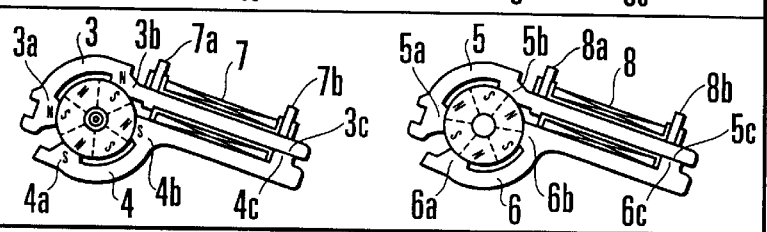

Next, when the second stator yokes 5 and 6 are deexcited, the excitation of the first stator yokes 3 and 4 causes the first rotor 1 to rotate 45 degrees further clockwise in electrical angle in such a way as to make the magnetization angle center of the first rotor 1 coincide with the angle center of the projections 3a, 3b, 4a and 5b. The first rotor 1 then comes to a stop after having rotated 45 degrees in electrical angle, as shown in FIG. 4(e). Thus, the stepping motor can be caused to rotate by continuously bringing about the above-stated excitation sequence. Incidentally, the stepping motor can be caused to rotate counterclockwise by reversing the above-stated excitation sequence.

With the stepping motor arranged as described above with reference to FIGS. 1 to 3 and 4(a) to 4(e), a first example in which the stepping motor as an electromagnetic driving device is applied to the diaphragm device of a camera is next described below with reference to FIGS. 5, 6 and 7.

Figure 5:
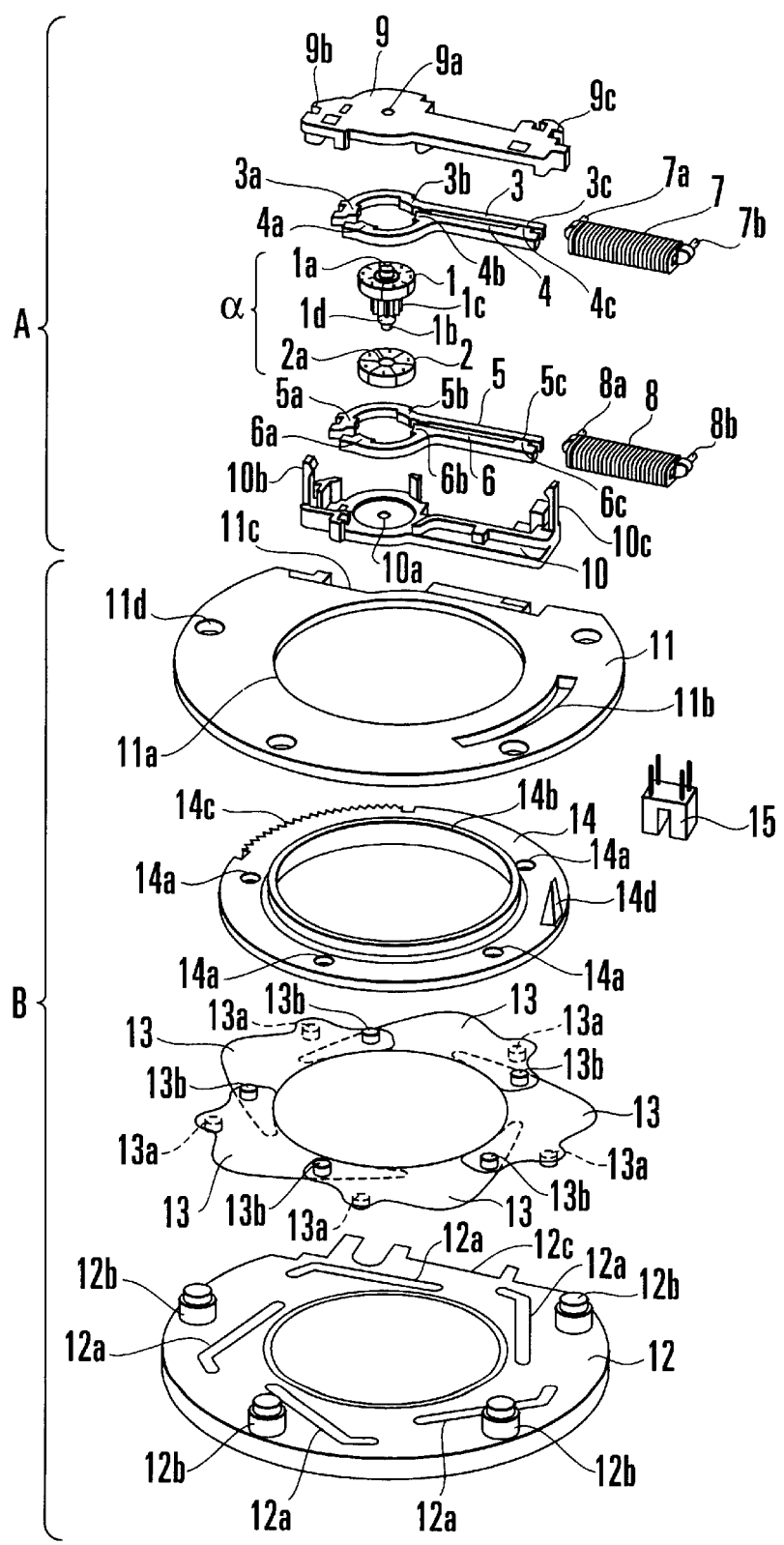
FIG. 5 is an exploded perspective view showing a first example in which the motor, serving as an electromagnetic driving device, shown in FIGS. 1 to 3 and 4(a) to 4(e) is applied to a diaphragm device of a camera.

FIG. 5 is an exploded perspective view of an electromagnetic driving diaphragm device in which the stepping motor as an electromagnetic driving device shown in FIGS. 1 to 3 and 4(a) to 4(e) is applied to the diaphragm device of a camera. FIG. 6 is a sectional view of the electromagnetic driving diaphragm device shown in FIG. 5 in an assembled state. FIG. 7 is a plan view showing in part the electromagnetic driving diaphragm device shown in FIG. 5.

In FIG. 5, reference symbol B denotes the whole diaphragm device. Reference symbol A denotes the above-described stepping motor, which is mounted on the diaphragm device B. Since the arrangement of the stepping motor A has been described above, the details of the stepping motor A are omitted from the following description.

Figure 6:
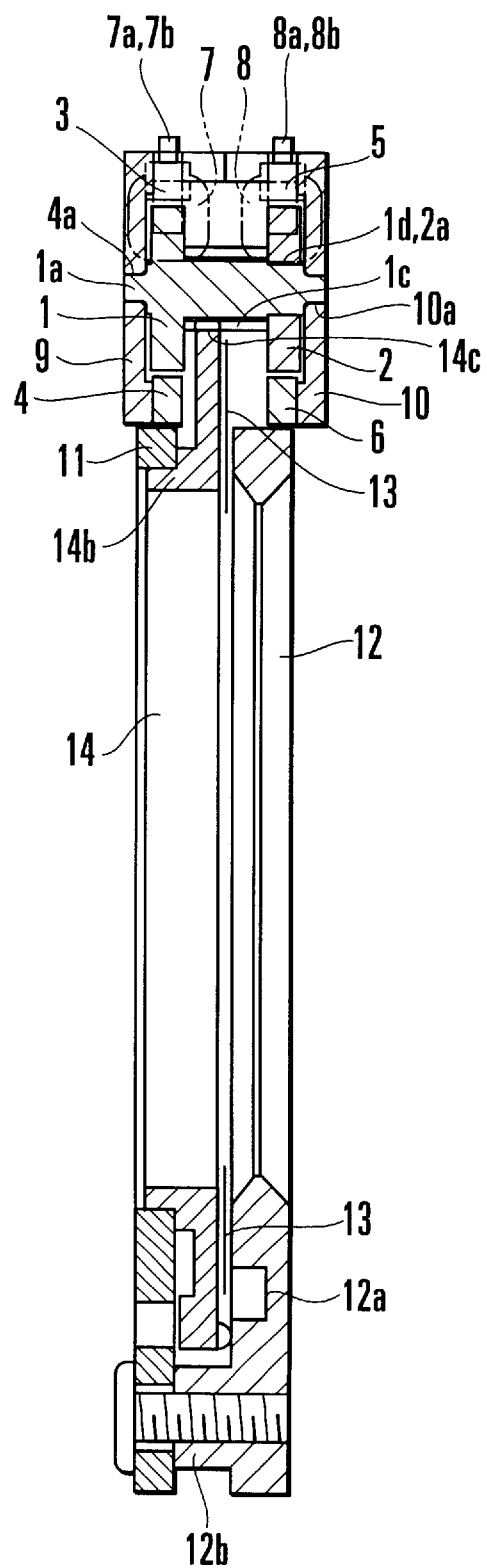
FIG. 6 is a sectional view of the electromagnetic driving diaphragm device shown in FIG. 5 in an assembled state.
Figure 7:
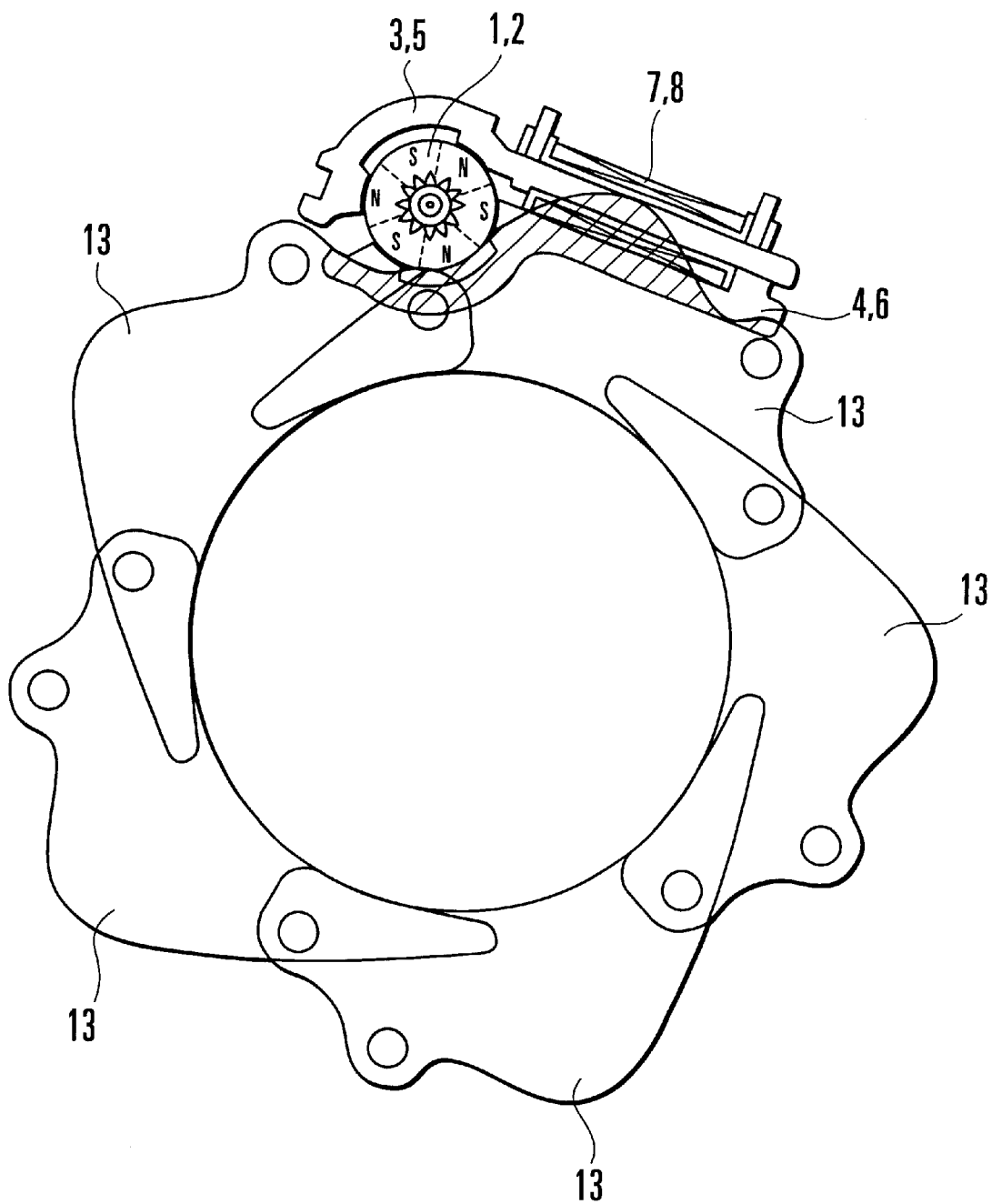
FIG. 7 is a plan view showing in part the electromagnetic driving diaphragm device shown in FIG. 5.

Referring to FIGS. 5, 6 and 7, a conductive annular base plate 11 has an aperture part 11a formed at its center part to allow light (photo-taking light, etc.) to pass therethrough. The annular base plate 11 has a cutaway part 11c formed at a part in the circumferential direction thereof to provide a space for disposing the above-stated first motor case 9 there. The first motor case 9 is disposed within this space and is secured to the annular base plate 11, for example, by bonding or press-fitting or by some other suitable method. By this arrangement, as shown in FIG. 6, the first motor case 9 and the first stator yokes 3 and 4 (and also the first coil 7) which are held by the first motor case 9 are secured to a position close to the peripheral end face of the cutaway part 11c of the annular base plate 11, i.e., close to the outer side of the annular base plate 11.

An annular cam plate 12 is made of an insulating material. A plurality of diaphragm cams 12a are formed in the cam plate 12. The cam plate 12 has a cutaway part 12c formed at a part in the circumferential direction thereof to provide a space for disposing the above-stated second motor case 10 there. The second motor case 10 is disposed within that space and is secured to the cam plate 12 by bonding or pressing-fitting or by some other suitable method. As shown in FIG. 6, the second motor case 10 and the second yokes 5 and 6 (and also the second coil 8) which are held by the second motor case 10 are thus secured to a position close to the peripheral end face of the cutaway part 12c of the cam plate 12, i.e., close to the outer side of the cam plate 12.

A plurality of diaphragm blades (light-blocking members) 13 are provided with dowels 13a, which are mounted on the reverse sides of the diaphragm blades 13 and are fitted in the diaphragm cams 12a of the cam plate 12.

A rotary ring (moving member) 14 is arranged to rotate around an optical axis and has an aperture part formed in its center part for allowing light (photo-taking light, etc.) to pass therethrough. A plurality of holes 14a are formed in the rotary ring 14. Dowels 13b which are formed on the surface of the diaphragm blades 13 are fitted in the holes 14a of the rotary ring 14.

A flange part 14b of the rotary ring 14 is fitted on the hole part 11a of the annular base plate 11. The rotary ring 14 is thus rotatably supported by the annular base plate 11. The rotary ring 14 is provided with a gear part 14c. The gear part 14c is arranged to be in mesh with the gear part 1c of the first rotor 1 within the electromagnetic driving motor A. The rotary ring 14 is provided further with a projection 14d which is arranged to be insertable into a slot 11b provided in the annular base plate 11. The cam plate 12 is provided with base seats 12b. The cam plate 12 is secured to the annular base plate 11 with screws or the like by inserting the base seats 12b in holes 11d of the annular base plate 11 with the rotary ring 14 interposed in between them. The annular base plate 11, the cam plate 12, the diaphragm blades 13 and the rotary ring 14 are thus unitized to form the diaphragm device B. The diaphragm device B is provided with a switch for detecting whether the aperture of the diaphragm device B is at a full open position.

A photo-interrupter 15 which is a component element of the switch is secured to the annular base plate 11 by bonding or some other known method. Whether or not the diaphragm is at its full-open aperture position is detected in the following manner. When the aperture of the diaphragm is fully opened, the projection 14d of the rotary ring 14 blocks light between the light projecting element and the light receiving element of the photo-interrupter 15, so that the full-open state of the aperture can be detected. The diaphragm device B is arranged in the above-described manner.

The arrangement described above operates in the following manner. When the electromagnetic driving motor A rotates, the output of the motor A is transmitted by the gear 1c of the first rotor 1 to the gear part 14c of the rotary ring 14. The rotary ring 14 is thus caused to rotate by a predetermined angle. The rotation of the rotary ring 14 causes the dowels 13b provided on the surfaces of the diaphragm blades 13 to move in the direction of the rotation. Then, the dowels 13a on the reverse sides of the diaphragm blades 13 are caused by their relation to the diaphragm cams 12a of the cam plate 12 to perform a stopping action in a known manner to swing the diaphragm blades 13 in the direction of opening or closing the aperture. An exposure is adjusted in this manner.

A layout relation between the electromagnetic driving motor A and the diaphragm device B is described below with reference to FIGS. 6 and 7. FIG. 6 is a sectional view of the electromagnetic driving diaphragm device on which the electromagnetic driving motor A is mounted. FIG. 7 is a plan view showing in part the electromagnetic driving diaphragm device.

Referring first to FIG. 6, the first stator yokes 3 and 4 are placed in a thrust space of the annular base plate 11. The second stator yokes 5 and 6 are placed in a thrust space of the cam plate 12. The gear 1c of the first rotor 1 is interposed in between the first stator yokes 3 and 4 and the second stator yokes 5 and 6 (in the center of thrust in the direction of the axis of rotation of the rotor) in such a way as to enable the gear 1c to intermesh with the gear part 14c of the rotary ring 14 which is interposed in between the annular base plate 11 and the cam plate 12. Therefore, the electromagnetic driving motor A can be arranged to be almost completely not protruding from the diaphragm device B. The electromagnetic driving diaphragm device is thus arranged to have the electromagnetic driving motor A mounted thereon with excellent matching.

Further, in mounting the electromagnetic driving motor A on the diaphragm device B, the gear part 14c of the rotary ring 14 and the gear 1c within the driving motor A can be intermeshed by sliding the whole electromagnetic driving motor A in the direction of orthogonally intersecting the direction of the axis of rotation of the rotary ring 14.

As apparent from FIGS. 6 and 7, the diaphragm blades 13 intrude into the electromagnetic driving motor A at their parts indicated with hatching in FIG. 7. In other words, the diaphragm blades 13 are arranged such that the loci of movement of the diaphragm blades 13 are allowed to be intruding into the thrust space between the first stator yokes 3 and 4 and the second stator yokes 5 and 6. The space of the motor A and the working space of the blades 13 are thus arranged to be in common as much as possible to eliminate dead spaces, thereby attaining a reduction in size of the electromagnetic driving diaphragm device.

Next, a second example in which the stepping motor as an electromagnetic driving device shown in FIGS. 1 to 3 and 4(a) to 4(e) is applied to the diaphragm device of a camera, is described below with reference to FIGS. 8 and 9.

Figure 8:
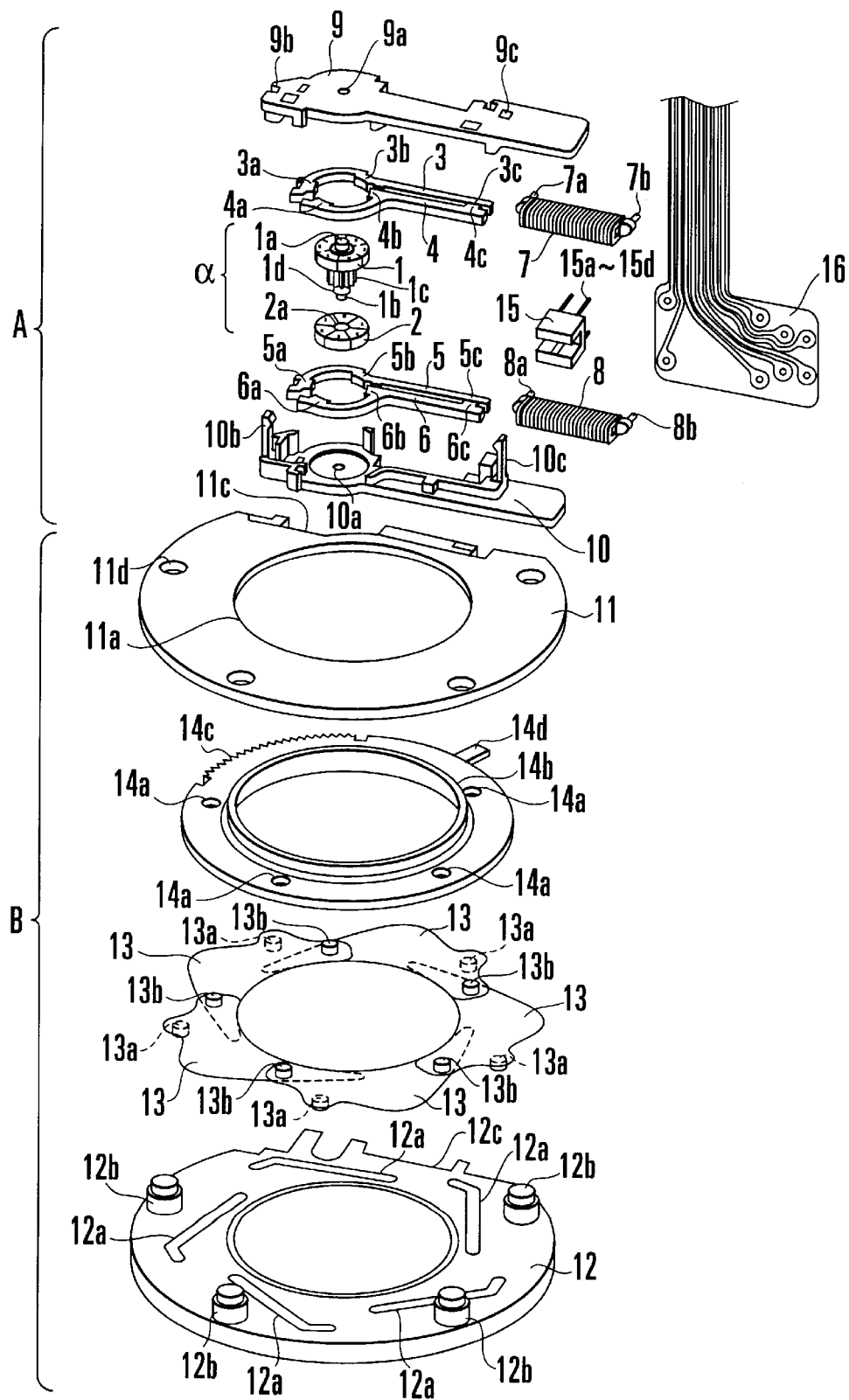
FIG. 8 is an exploded perspective view showing a second example in which the motor, serving as an electromagnetic driving device, shown in FIGS. 1 to 3 and 4(a) to 4(e) is applied to a diaphragm device of a camera.

FIG. 8 is an exploded perspective view of an electromagnetic driving diaphragm device in which the stepping motor as an electromagnetic driving device shown in FIGS. 1 to 3 and 4(a) to 4(e) is applied to the diaphragm device of a camera. FIG. 9 is a sectional view of the electromagnetic driving diaphragm device shown in FIG. 8 in an assembled state. In FIG. 8, reference symbol B denotes the whole diaphragm device. The motor A which is arranged as described in the foregoing is mounted on the diaphragm device B. The diaphragm device B of the second example differs from that of the first example in that the diaphragm device B of the second example is provided with a sensor 15, which is arranged as described below.

The sensor 15 is arranged to detect whether or not the diaphragm blades 13 are at a full-open position. The sensor 15 is a photo-interrupter composed of a light projecting part and a light receiving part which are opposed to each other. Terminal parts 15a to 15d are connected to the light projecting part and light receiving part. The photo-interrupter 15 is interposed in between the first motor case 9 and the second motor case 10 and is secured to the motor cases 9 and 10 by bonding or the like. The photo-interrupter 15 is thus set in the neighborhood of the peripheral end of a space between the annular base plate 11 and the cam plate 12.

The photo-interrupter 15 is arranged to detect that the diaphragm blades 13 are at a full-open position, when the projection (light-blocking part) 14d provided on the periphery of the rotary ring 14 comes into a space between the light projecting part and the light receiving part to block detection light projected from the light projecting part to the light receiving part.

Reference numeral 16 denotes a flexible printed circuit board to which the terminals 7a and 7b of the first coil 7, the terminals 8a and 8b of the second coil 8 and the terminals 15a to 15d of the photo-interrupter 15 are connected by soldering.

As is apparent from FIG. 8, the terminals 7a and 7b of the first coil 7, the terminals 8a and 8b of the second coil 8 and the terminals 15a to 15d of the photo-interrupter 15 all extend in about the same direction. The extending direction of these terminals orthogonally intersects the direction of the optical axis, in which the annular base plate 11, the rotary ring 14 and the cam plate 12 are arranged. In soldering the terminals 7a, 7b, 8a, 8b and 15a to 15d to the flexible printed circuit board 16, therefore, all of them can be soldered at the same time without incurring any increase in the number of assembly processes. The arrangement also effectively prevents any increase in size of the flexible printed circuit board 16. The flexible printed circuit board 16 is electrically connected to a motor driving control circuit board which is not shown.

Motor driving steps are arranged to be repeated as many times as the number of exciting pulses are supplied to the terminals 7a, 7b, 8a and 8b of the coils 7 and 8 from the motor driving control circuit board through the flexible printed circuit board 16.

The operation of the diaphragm device B which acts by receiving a driving force from the stepping motor A is next described as follows. When the stepping motor A rotates, its output is transmitted through the gear 1c to the gear part 14c of the rotary ring 14. This causes the rotary ring 14 to rotate by a predetermined angle. The rotation of the rotary ring 14 then causes the surface dowels 13b of the diaphragm blades 13 to move in the direction of the rotation.

Then, the diaphragm cams 12a provided in the cam plate 12 act to cause the dowels 13a on the reverse sides of the diaphragm blades 13 to swing either in the opening or closing direction to open or close the aperture of the diaphragm. By this operation, an exposure is adjusted for photo-taking by the camera.

The position of the photo-interrupter 15 in relation to the diaphragm device B (a layout relation of them) is next described with reference to FIG. 9.

Figure 9:
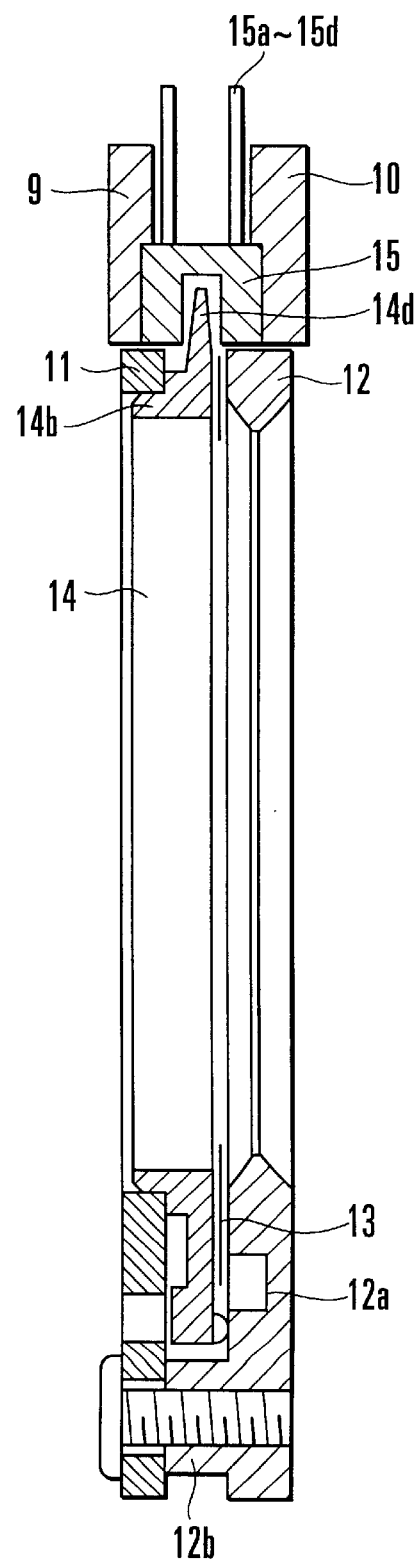
FIG. 9 is a sectional view of the electromagnetic driving diaphragm device shown in FIG. 8 in an assembled state.

Referring to FIG. 9, the photo-interrupter 15 is disposed in a space which confronts the outer peripheral end face of the rotary ring 14, i.e., in a space across which the peripheral end of the annular base plate 11 and that of the cam plate 12 are opposed to each other, in a state of being interposed in between the first motor case 9 and the second motor case 10. The photo-interrupter 15, therefore, does not protrude from the diaphragm device B. In mounting the diaphragm device B on an optical apparatus such as a lens barrel, a camera or the like, this arrangement permits the optical apparatus to be designed free from any adverse effect of a protruding sensor.

In the case of the embodiment described above, the invention is applied to an electromagnetic driving diaphragm device (an electromagnetic light-quantity adjusting device). However, the invention is applicable also to electromagnetic operating devices of varied kinds other than the electromagnetic driving diaphragm device described above.

The embodiment described above is arranged to use a photo-interrupter for detecting the action of the device. However, the arrangement may be changed to use some other detecting means, such as a photo-reflector or an electrical switch or the like, in place of the photo-interrupter.

According to the present invention, as described above, an electromagnetic driving motor has a first stator yoke arranged to be excited by energizing a first coil, a second stator yoke arranged to be excited by energizing a second coil, and a rotor opposed to the first stator yoke and the second stator yoke and arranged to be driven to rotate by controlling the energizing actions on the first coil and the second coil, wherein the first coil and the second coil are collectively arranged in one direction outside the peripheral part of the rotor, and the first stator yoke and the second stator yoke are disposed so as to be superposed on each other. By virtue of this arrangement, the electromagnetic driving motor according to the invention can be arranged within a limited space available. The motor according to the invention, therefore, is usable for products of varied kinds to be arranged in compact sizes in the future according to the trend of reduction in size. Further, the rotor has a rotation output part arranged, at the center part of thrust in the direction of axis of rotation, to permit a rotation output to be taken out through the thrust clearance (space) between the first stator yoke and the second stator yoke. This arrangement permits an electromagnetic driving motor to be arranged in a novel shape to prevent generation of motor driving transmission noises and vibrations. Moreover, the electromagnetic driving motor can be mounted on the diaphragm device of a camera or the like without having the motor protruding from the diaphragm device or the like.

According to the present invention, lateral pressure on the rotor shaft due to the load on the member working to drive the diaphragm is received and borne by a center-impeller type arrangement. The rotor shaft, therefore, does not make any whirling rotation like in the case of an overhanging-impeller (cantilever) type arrangement. Therefore, an electromagnetic driving motor of high quality, making no rotor chatter and generating no noise, can be mounted on the electromagnetic driving diaphragm device.

Further, according to the present invention, the loci of motions of the diaphragm blades are allowed to intrude into a clearance provided between the fist stator yoke and the second stator yoke. This arrangement permits a space for the motor and a working space for the diaphragm blades to be arranged in common with each other as much as possible. The device, therefore, can be compactly arranged without leaving any dead space.

What is claimed is:

1. An electromagnetic driving device comprising:
   a first permanent magnet;
   a second permanent magnet arranged to be opposed to said first permanent magnet;
   a rotation shaft arranged to interconnect said first permanent magnet and said second permanent magnet, said rotation shaft constituting a rotor in conjunction with said first permanent magnet and said second permanent magnet and having a rotation output part arranged to allow a rotation output to be externally taken out from between said first permanent magnet and said second permanent magnet;
   a first stator yoke having magnetic poles opposed to a peripheral part of said first permanent magnet, said first stator yoke being arranged to extend from the peripheral part of said first permanent magnet toward an outside thereof;
   a second stator yoke having magnetic poles opposed to a peripheral part of said second permanent magnet, said second stator yoke being arranged to extend from the peripheral part of said second permanent magnet toward an outside thereof in the same direction as the extending direction of said first stator yoke;
   a first coil arranged to excite said first stator yoke, said first coil being disposed at said first stator yoke; and
   a second coil arranged to excite said second stator yoke, said second coil being disposed at said second stator yoke.

2. An electromagnetic driving device according to claim 1, wherein one end side of said first stator yoke is provided with the magnetic poles and the other end side of said first stator yoke extends from the peripheral part of said first permanent magnet toward the outside thereof, and one end side of said second stator yoke is provided with the magnetic poles and the other end side of said second stator yoke extends from the peripheral part of said second permanent magnet toward the outside thereof in the same direction as the extending direction of the other end side of said first stator yoke.

3. An electromagnetic driving device according to claim 1, wherein the rotation output part of said rotation shaft has a gear for externally taking out the rotation output.

4. An electromagnetic driving device according to claim 3, wherein the rotation output of the gear formed on said rotation shaft is used for driving a diaphragm of a diaphragm device.

5. An electromagnetic driving device according to claim 1, wherein a diameter of the rotation output part of said rotation shaft is smaller than a diameter of each of said first permanent magnet and said second permanent magnet, and the rotation output is externally taken out through a clearance across which said first permanent magnet and said second permanent magnet are opposed to each other.

6. An electromagnetic driving device according to claim 1, wherein said first stator yoke is arranged to be superposed on said second stator yoke.

7. An electromagnetic driving device comprising:
   a rotor having a rotation output part;
   a first stator yoke opposed to a peripheral part of said rotor, said first stator yoke being arranged to extend from the peripheral part of said rotor toward an outside thereof;
   a second stator yoke opposed to the peripheral part of said rotor, said second stator yoke being arranged to extend from the peripheral part of said rotor toward the outside thereof in the same direction as the extending direction of said first stator yoke;
   a first coil arranged to excite said first stator yoke, said first coil being disposed at said first stator yoke; and
   a second coil arranged to excite said second stator yoke, said second coil being disposed at said second stator yoke,
   wherein the rotation output part of said rotor is arranged to allow a rotation output to be externally taken out from a thrust clearance between said first stator yoke and said second stator yoke.

8. An electromagnetic driving device according to claim 7, further comprising:
   a first fixing member arranged to support said first stator yoke and said first coil; and
   a second fixing member arranged to support said second stator yoke and said second coil, said second fixing member being engaged with said first fixing member.

9. An electromagnetic driving device according to claim 8 further comprising a moving member arranged to be movable between said first fixing member and said second fixing member, said moving member being driven by the rotation output part of said rotor.

10. An electromagnetic driving device according to claim 9, wherein said moving member is arranged to intrude into the thrust clearance between said first stator yoke and said second stator yoke.

11. An electromagnetic driving device comprising:
   a rotor having a rotation output part;
   a first stator yoke opposed to a peripheral part of said rotor;
   a second stator yoke opposed to the peripheral part of said rotor, said second stator yoke being arranged to extend from the peripheral part of said rotor toward an outside thereof together with said first stator yoke and being disposed to be superposed on said first stator yoke;
   a first coil arranged at said first stator yoke to excite said first stator yoke; and
   a second coil arranged at said second stator yoke to excite said second stator yoke, energization of said first coil and said second coil being controlled to control rotation of said rotor,
   wherein the rotation output part of said rotor is arranged to allow a rotation output to be externally taken out from a thrust clearance between said first stator yoke and said second stator yoke.

12. An electromagnetic driving device according to claim 11, further comprising:
   a first fixing member arranged to support said first stator yoke and said first coil; and
   a second fixing member arranged to support said second stator yoke and said second coil, said first fixing member and said second fixing member being engaged with each other to be united.

13. An electromagnetic driving device according to claim 12, further comprising a moving member arranged to be movable between said first fixing member and said second fixing member, said moving member being driven by the rotation output part of said rotor.

14. An electromagnetic driving device according to claim 11, wherein said first stator yoke and said second stator yoke are made of the same part, and said first coil and said second coil are made of the same part.

15. An electromagnetic driving device comprising:
   a rotor having a rotation output part arranged to allow a rotation output to be externally taken out;
   a first stator yoke opposed to a peripheral part of said rotor;
   a second stator yoke opposed to the peripheral part of said rotor, said second stator yoke being arranged to extend from the peripheral part of said rotor toward an outside thereof together with said first stator yoke and being disposed to be superposed on said first stator yoke;
   a first coil arranged at said first stator yoke to excite said first stator yoke;
   a second coil arranged at said second stator yoke to excite said second stator yoke, energization of said first coil and said second coil being controlled to control rotation of said rotor;
   a first fixing member arranged to support said first stator yoke and said first coil, said first fixing member having an aperture part formed on an inner circumferential side thereof to allow photo-taking light to pass therethrough;
   a plurality of diaphragm blades arranged to adjust a quantity of the photo-taking light;
   a second fixing member arranged to hold said plurality of diaphragm blades between said first fixing member and said second fixing member; and
   a working member for driving said plurality of diaphragm blades, said working member being arranged between said first fixing member and said second fixing member to be driven by the rotation output part of said rotor,
   wherein the rotation output part of said rotor is arranged to allow the rotation output to be externally taken out from a thrust clearance between said first stator yoke and said second stator yoke.

16. An electromagnetic driving device according to claim 15, wherein said working member is arranged to intrude into the thrust clearance between said first stator yoke and said second stator yoke.

17. An electromagnetic driving device according to claim 15, wherein said rotor has a first permanent magnet, a second permanent magnet arranged to be opposed to said first permanent magnet, and a rotation shaft arranged to interconnect said first permanent magnet and said second permanent magnet.

18. An electromagnetic driving device comprising:
   a rotor having a rotation output part arranged to allow a rotation output to be externally taken out;
   a first stator yoke opposed to a peripheral part of said rotor;

a second stator yoke opposed to the peripheral part of said rotor, said second stator yoke being arranged to extend from the peripheral part of said rotor toward an outside thereof together with said first stator yoke and being disposed to be superposed on said first stator yoke;

a first coil arranged at said first stator yoke to excite said first stator yoke;

a second coil arranged at said second stator yoke to excite said second stator yoke, energization of said first coil and said second coil being controlled to control rotation of said rotor;

a first fixing member arranged to support said first stator yoke and said first coil;

a second fixing member arranged to support said second stator yoke and said second coil, said second fixing member being engaged with said first fixing member;

a moving member arranged to be movable between said first fixing member and said second fixing member, said moving member being driven by the rotation output part of said rotor; and detection means, disposed at a position approximately opposed to a peripheral part of said moving member, for detecting movement of said moving member, wherein said first coil and said second coil are arranged in alignment in a direction in which said first fixing member, said second fixing member and said moving member are arranged, and wherein a terminal part of said first coil, a terminal part of said second coil and a terminal part of said detection means are arranged to extend in a direction perpendicular to the direction in which said first fixing member, said second fixing member and said moving member are arranged.

19. An electromagnetic driving device according to claim 18, wherein said detection means includes an optical sensor having a light emitting part and a light receiving part, and detects the movement of said moving member according to a light-blocking part formed at the peripheral part of said moving member coming into and going out from a space between the light emitting part and the light receiving part.

20. An electromagnetic driving device comprising:

a rotor having a rotation output part arranged to allow a rotation output to be externally taken out;

a first stator yoke opposed to a peripheral part of said rotor;

a second stator yoke opposed to the peripheral part of said rotor, said second stator yoke being arranged to extend from the peripheral part of said rotor toward an outside thereof together with said first stator yoke and being disposed to be superposed on said first stator yoke;

a first coil arranged at said first stator yoke to excite said first stator yoke;

a second coil arranged at said second stator yoke to excite said second stator yoke, energization of said first coil and said second coil being controlled to control rotation of said rotor;

a first fixing member arranged to support said first stator yoke and said first coil, said first fixing member having an aperture part formed on an inner circumferential side thereof to allow photo-taking light to pass therethrough;

a plurality of diaphragm blades arranged to adjust a quantity of the photo-taking light;

a second fixing member arranged to hold said plurality of diaphragm blades between said first fixing member and said second fixing member;

a working member for driving said plurality of diaphragm blades, said working member being arranged between said first fixing member and said second fixing member to be driven by the rotation output part of said rotor; and detection means, disposed at a position approximately opposed to a peripheral part of said working member, for detecting movement of said working member, wherein said first coil and said second coil are arranged in alignment in a direction in which said first fixing member, said second fixing member and said working member are arranged, and wherein a terminal part of said first coil, a terminal part of said second coil and a terminal part of said detection means are arranged to extend in a direction perpendicular to the direction in which said first fixing member, said second fixing member and said working member are arranged.

21. An electromagnetic driving device according to claim 20, wherein said detection means includes an optical sensor having a light emitting part and a light receiving part, and detects the movement of said working member according to a light-blocking part formed at the peripheral part of said working member coming into and going out from a space between the light emitting part and the light receiving part.

* * * * *

UNITED STATES PATENT AND TRADEMARK OFFICE
CERTIFICATE OF CORRECTION

PATENT NO. : 6,331,741 B1
DATED : December 18, 2001
INVENTOR(S) : Ryuji Suzuki

Page 1 of 1

It is certified that error appears in the above-identified patent and that said Letters Patent is hereby corrected as shown below:

Column 4,
Line 3, "away 360 degrees" should read -- 360 degrees away --.
Line 38, "on" should be deleted.

Column 5,
Line 47, "to" should be deleted.
Line 58, "still" should be deleted.

Column 8,
Line 1, "of" should be deleted.

Signed and Sealed this

Twenty-third Day of April, 2002

*Attest:*

JAMES E. ROGAN
*Attesting Officer*   *Director of the United States Patent and Trademark Office*